US012678931B2

(12) United States Patent
Chang

(10) Patent No.: US 12,678,931 B2
(45) Date of Patent: Jul. 14, 2026

---

(54) WHEELED STAND FOR TABLE SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 238 days.

(21) Appl. No.: 18/217,971

(22) Filed: Jul. 3, 2023

(65) Prior Publication Data

US 2025/0010456 A1     Jan. 9, 2025

(51) Int. Cl.
B25H 1/00     (2006.01)
B23D 47/02     (2006.01)
B25H 1/04     (2006.01)

(52) U.S. Cl.
CPC ......... B25H 1/0042 (2013.01); B23D 47/025 (2013.01); B25H 1/04 (2013.01)

(58) Field of Classification Search
CPC .......... B25H 1/04; B25H 1/0042; B25H 1/00; B25H 1/0021; B25H 1/005; B25H 1/02; B25H 1/06; B23D 47/025; B23D 47/02; B23D 57/0092; B23D 55/02; B23D 55/023; B23D 55/026; B23D 51/02; B23D 51/03
See application file for complete search history.

(56) References Cited

U.S. PATENT DOCUMENTS

| | | | | |
|---|---|---|---|---|
| 6,182,935 B1 * | 2/2001 | Talesky | ................ | B23D 47/025 |
| | | | | 108/118 |
| D519,747 S * | 5/2006 | Wu | ................................. | D6/684 |
| 7,077,421 B2 * | 7/2006 | Wu | ........................... | B25H 1/04 |
| | | | | 280/30 |
| 7,222,865 B2 * | 5/2007 | Chen | ........................ | F16M 3/00 |
| | | | | 280/654 |
| 7,278,646 B2 * | 10/2007 | Chuang | .................... | B25H 1/14 |
| | | | | 280/47.35 |
| 7,487,947 B2 * | 2/2009 | Liu | ........................... | B62B 1/26 |
| | | | | 248/439 |
| 7,849,966 B2 * | 12/2010 | Chiu | ........................ | B25H 1/04 |
| | | | | 280/35 |
| 7,882,870 B2 * | 2/2011 | Lee | ........................... | B25H 1/04 |
| | | | | 144/287 |
| 8,096,519 B2 * | 1/2012 | Tam | ......................... | B62B 1/00 |
| | | | | 248/128 |
| 8,313,076 B2 * | 11/2012 | Tam | ......................... | B62B 1/00 |
| | | | | 248/128 |
| 8,464,994 B2 * | 6/2013 | Chiu | ...................... | F16M 11/38 |
| | | | | 144/286.5 |

(Continued)

FOREIGN PATENT DOCUMENTS

| | | | | |
|---|---|---|---|---|
| CA | 2699810 A1 * | 10/2010 | ............... | B25H 1/04 |
| DE | 202017003765 U1 * | 8/2017 | ............... | B25H 1/16 |

*Primary Examiner* — Adam J Eiseman

(74) *Attorney, Agent, or Firm* — Apex Juris, pllc; Hilde M. L. Coeckx

(57)     ABSTRACT

A wheeled stand for a table saw has a stand body, two wheels rotatably connected to the stand body, and a kickstand pivotably connected to the stand body. The stand body has a first side, a second side, an infeed side, and an outfeed side. The two wheels are disposed near the second side of the stand body. The kickstand disposed at the outfeed side of the stand body and has a folded position and an unfolded position in which the kickstand obliquely extends downwardly and away from the infeed side of the stand body. The kickstand can be unfolded and support the stand body at the outfeed side thereof during cutting a workpiece to prevent the wheeled stand from being tipped over.

4 Claims, 8 Drawing Sheets

(56)         References Cited

U.S. PATENT DOCUMENTS

| 8,517,413 | B2 * | 8/2013 | Chen | B25H 1/04 |
| | | | | 248/370 |
| 8,523,123 | B2 * | 9/2013 | Chiu | A47B 31/04 |
| | | | | 108/115 |
| 8,910,970 | B2 * | 12/2014 | Chen | B25H 1/04 |
| | | | | 280/652 |
| 9,149,926 | B2 * | 10/2015 | Chen | F16M 11/38 |
| 9,156,486 | B2 * | 10/2015 | Liu | B25H 1/0021 |
| 9,186,736 | B1 * | 11/2015 | Chang | B62B 1/10 |
| 9,669,540 | B2 * | 6/2017 | Chen | A47B 3/02 |
| 10,005,178 | B1 * | 6/2018 | Chou | F16M 3/00 |
| 10,518,433 | B2 * | 12/2019 | Torres | B27B 5/29 |
| 11,027,411 | B2 * | 6/2021 | Van Bergen | B23D 47/025 |
| 2008/0067300 | A1 * | 3/2008 | Liu | F16M 3/00 |
| | | | | 248/166 |
| 2008/0067786 | A1 * | 3/2008 | Liu | B25H 1/04 |
| | | | | 24/1 |
| 2008/0115701 | A1 * | 5/2008 | Sugiura | B25H 1/04 |
| | | | | 108/131 |
| 2009/0205474 | A1 * | 8/2009 | Liu | B27B 5/29 |
| | | | | 83/435.13 |
| 2019/0329336 | A1 * | 10/2019 | Chan | B25H 1/04 |

* cited by examiner

WHEELED STAND FOR TABLE SAW

BACKGROUND OF THE INVENTION

1. Field of the Invention

The present invention relates to a stand for a table saw, and more particular to a wheeled stand for a portable table saw.

2. Description of Related Art

A portable table saw is adapted to allow a user to carry the portable table saw to various workplaces for cutting workpieces. In order to facilitate delivery of the portable table saw, the portable table saw is usually mounted on a conventional wheeled stand, so the user can effortlessly push the conventional wheeled stand to deliver the portable table saw from one workplace to another.

The conventional wheeled stand substantially comprises a platform for mounting the portable table saw, four legs disposed below the platform, and two wheels respectively connected to two of the four legs disposed at a rear side of the conventional wheeled stand. In order to let the conventional wheeled stand pass through a building entrance or a stair entrance, a width of the conventional wheeled stand or a distance between the two wheels is limited and is usually less than or equal to 30 inches.

When the portable table saw is mounted on the platform, an infeed side of the portable table saw faces the left of the conventional wheeled stand and an outfeed side of the portable table saw faces the right of the conventional wheeled stand. When the user stands at the infeed side of the portable table saw and pushes a workpiece toward the outfeed side through a saw of the portable table saw for cutting the workpiece, the conventional wheeled stand is subjected to a force toward the right side, and is prone to be tipped over toward the outfeed side of the portable table saw.

To overcome the shortcomings, the present invention tends to provide a wheeled stand for a portable table saw to mitigate or obviate the aforementioned problems.

SUMMARY OF THE INVENTION

The main objective of the invention is to provide a wheeled stand for a portable table saw having function of anti-tip during cutting workpiece.

A wheeled stand for a table saw has a stand body, two wheels rotatably connected to the stand body, and a kickstand pivotally connected to the stand body. The stand body has a first side, a second side, an infeed side, and an outfeed side. The two wheels are disposed near the second side of the stand body. The kickstand is disposed at the outfeed side of the stand body and has a folded position and an unfolded position in which the kickstand obliquely extends downwardly and away from the infeed side of the stand body. The kickstand can be unfolded and support the stand body at the outfeed side thereof during cutting a workpiece to prevent the wheeled stand from being tipped over.

Other objects, advantages and novel features of the invention will become more apparent from the following detailed description when taken in conjunction with the accompanying drawings.

DETAILED DESCRIPTION OF PREFERRED EMBODIMENT

Figure 1:
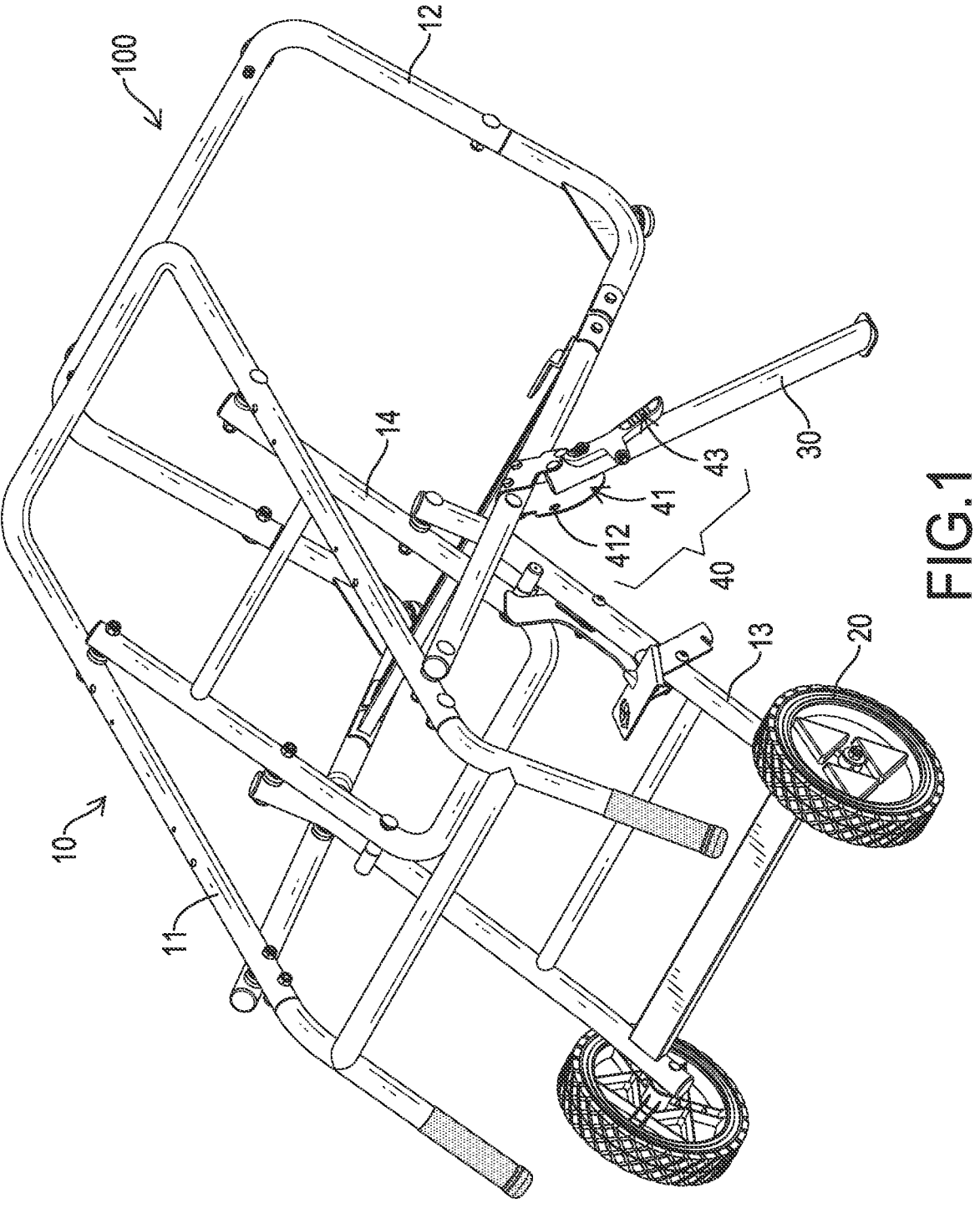
FIG. 1 is a perspective view of a wheeled stand for a portable table saw in accordance with the present invention, showing that a kickstand of the wheeled stand is unfolded.
Figure 8:
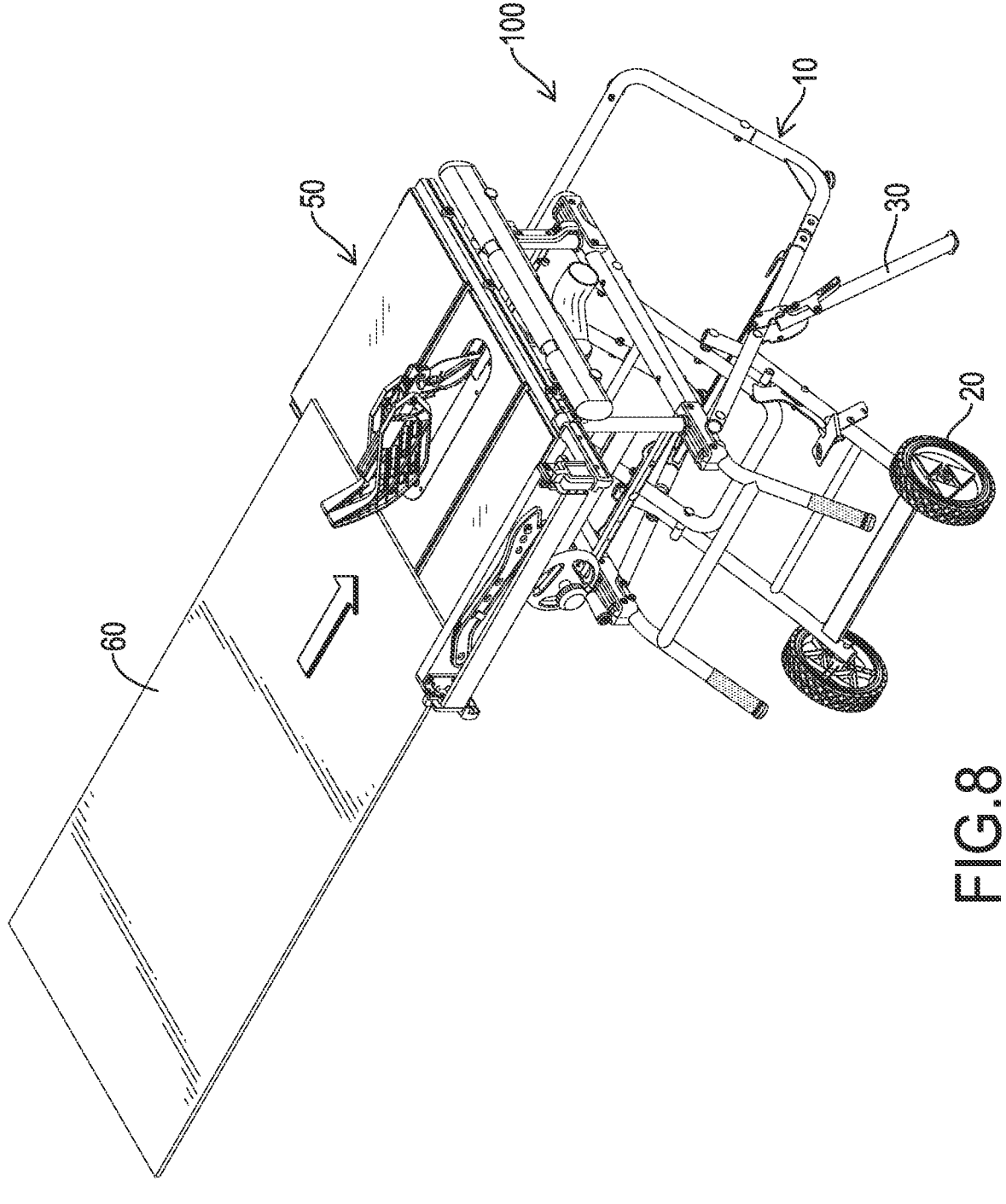
FIG. 8 is an operational perspective view of the wheeled stand in FIG. 1, showing that a workpiece is cut by a portable table saw mounted on the wheeled stand.

With reference to FIGS. 1 and 8, a wheeled stand 100 in accordance with the present invention is adapted for carrying a table saw 50 as shown in FIG. 8.

With reference to FIGS. 1 to 4, and 8, the wheeled stand 100 comprises a stand body 10, two wheels 20, and a foldable kickstand 30. The stand body 10 has a first side, a second side, an infeed side, and an outfeed side. The first side and the second side are opposite to each other. The infeed side and the outfeed side are opposite to each other. The infeed side is defined as a side where a workpiece 60 enters into the table saw 50. The outfeed side is defined as a side where the workpiece 60 leaves the table saw 50.

The two wheels 20 are rotatably connected to the stand body 10, are disposed near the second side of the stand body 10, and are respectively disposed near the infeed side and the outfeed side of the stand body 10.

Figure 2:
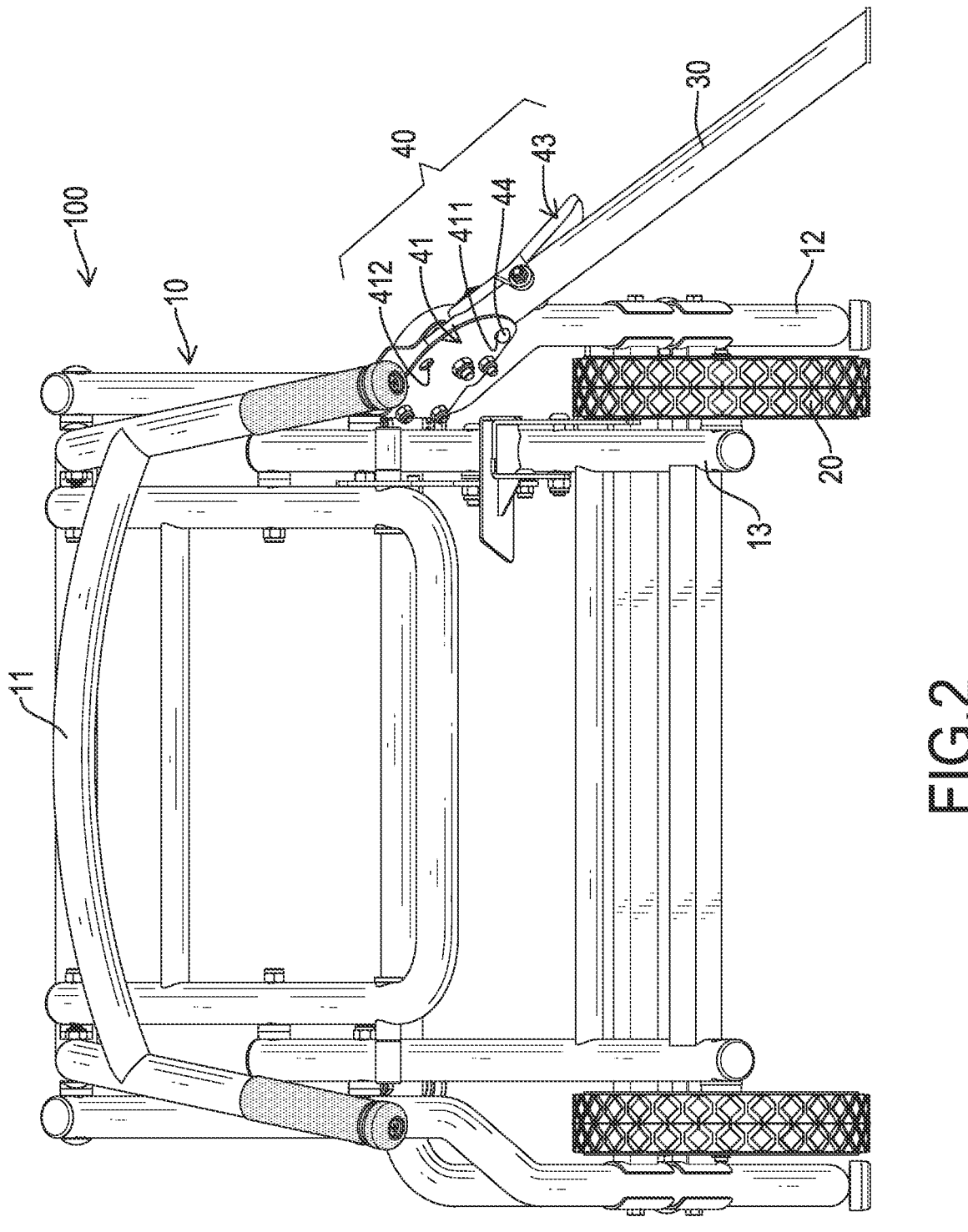
FIG. 2 is a side view of the wheeled stand in FIG. 1.
Figure 6:
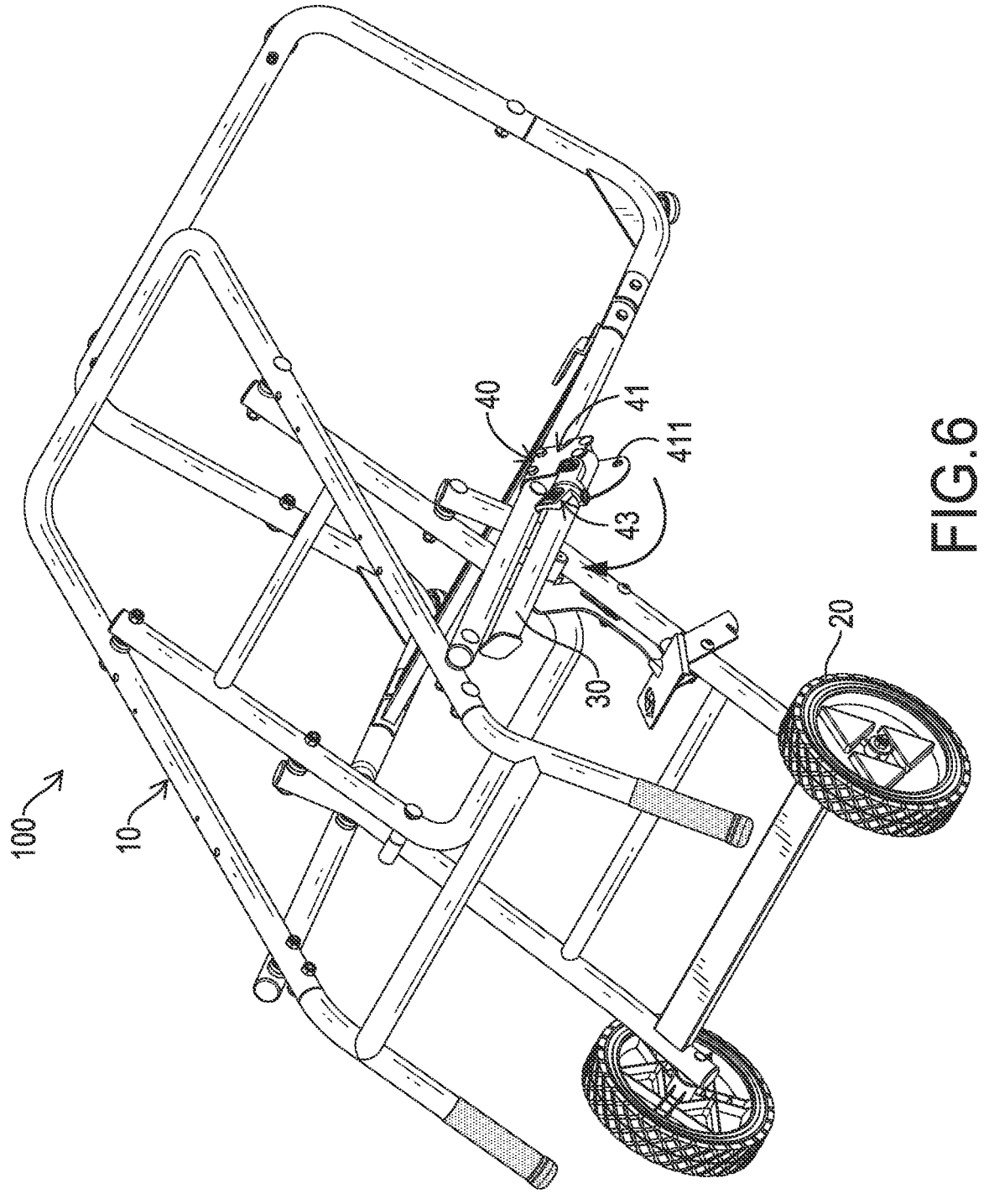
FIG. 6 is a perspective view of the wheeled stand in FIG. 1, showing that the kickstand is folded.
Figure 7:
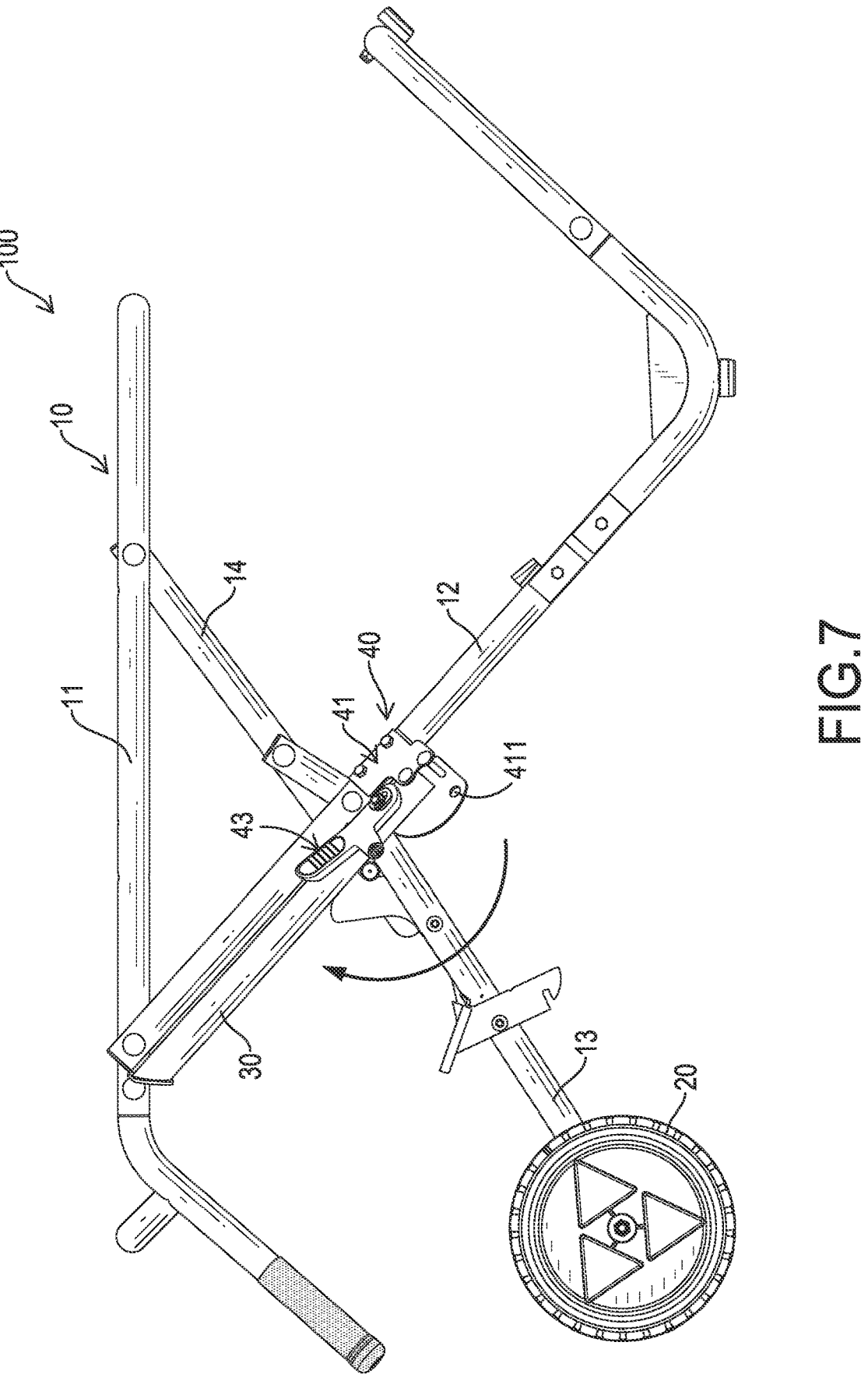
FIG. 7 is an outfeed side view of the wheeled stand in FIG. 6.

With reference to FIGS. 1, 2, 6, and 7, the kickstand 30 is pivotally connected to the stand body 10 and is disposed at the outfeed side of the stand body 10 at a middle of the outfeed side of the stand body 10. The kickstand 30 has a folded position as shown in FIGS. 6 and 7. The kickstand 30 also has an unfolded position as shown in FIGS. 1 and 2, that obliquely extends downwardly and away from the infeed side of the stand body 10.

With reference FIGS. 1 to 6, a lock assembly 40 is connected between the stand body 10 and the kickstand 30 to keep the kickstand 30 in the folded position (as shown in FIG. 6) or in the unfolded position (as shown in FIG. 1). The lock assembly 40 comprises a positioning seat 41, an unlocking handle 43, a locking pin 44, and a spring 45. The positioning seat 41 is mounted to the stand body 10 and has a first locking hole 411 and a second locking hole 412 arranged at an angular interval. The first locking hole 411 corresponds to the unfolded position of the kickstand 30 in position and the second locking hole 412 corresponds to the folded position of the kickstand 30 in position. The kickstand 30 is pivotally connected to the positioning seat 41 via a kickstand pivot 42. The kickstand 30 is pivotally connected to the stand body 10 via the positioning seat 41. The unlocking handle 43 is pivotally connected to the kickstand 30 via a handle pivot 435. The locking pin 44 is connected to the unlocking handle 43 and extends through the kickstand 30. The locking pin 44 may selectively extend into one of the first and the second locking holes 411, 412 to lock the kickstand 30 at either one of the unfolded position and folded position. The spring 45 is mounted around the locking pin 44, disposed inside the kickstand 30, and abuts against both the locking pin 44 and the kickstand 30. The spring 45 pushes the locking pin 44 away from the unlocking

Figure 3:
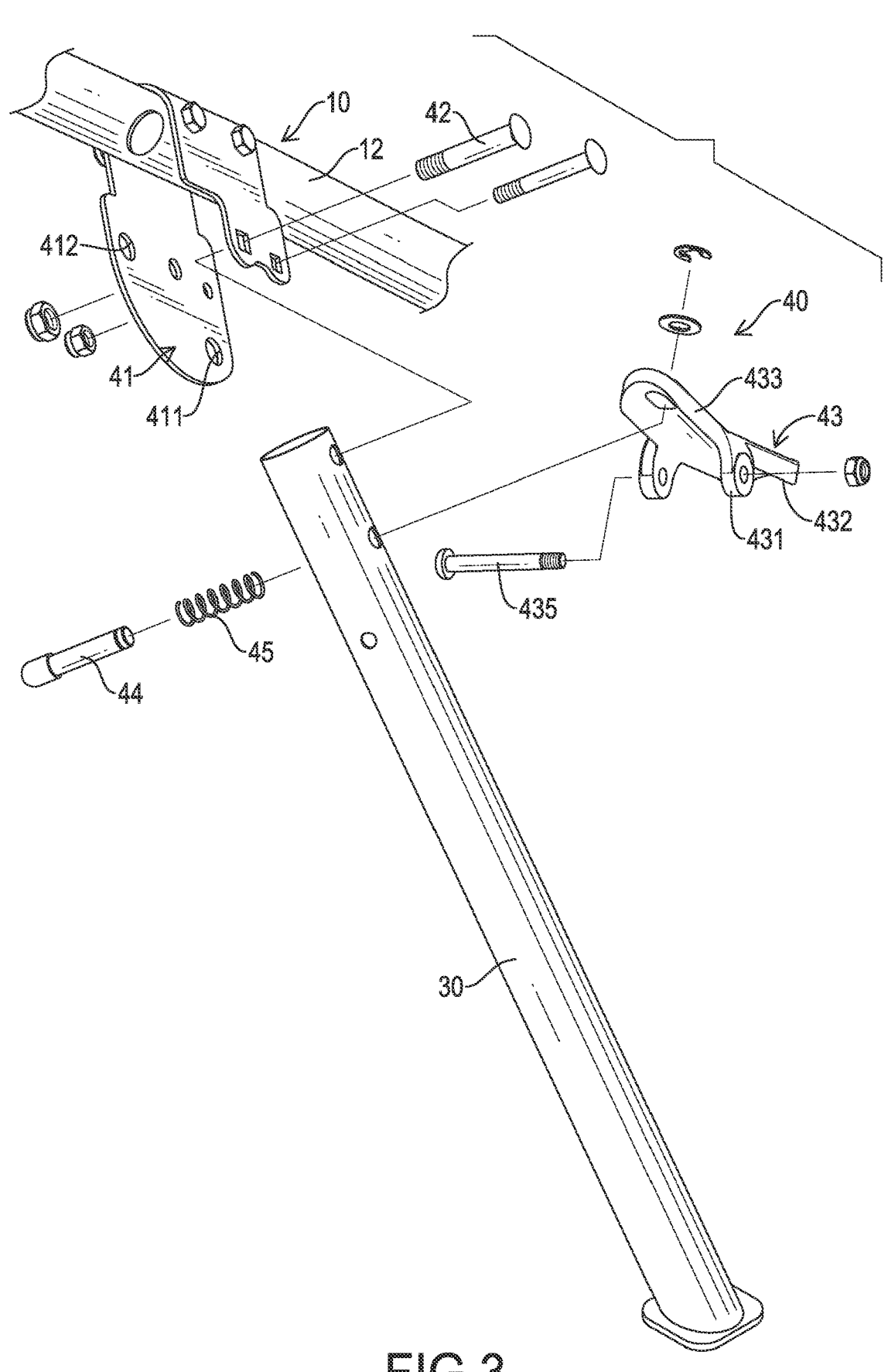
FIG. 3 is a partially exploded perspective view of the wheeled stand in FIG. 1.
Figure 4:
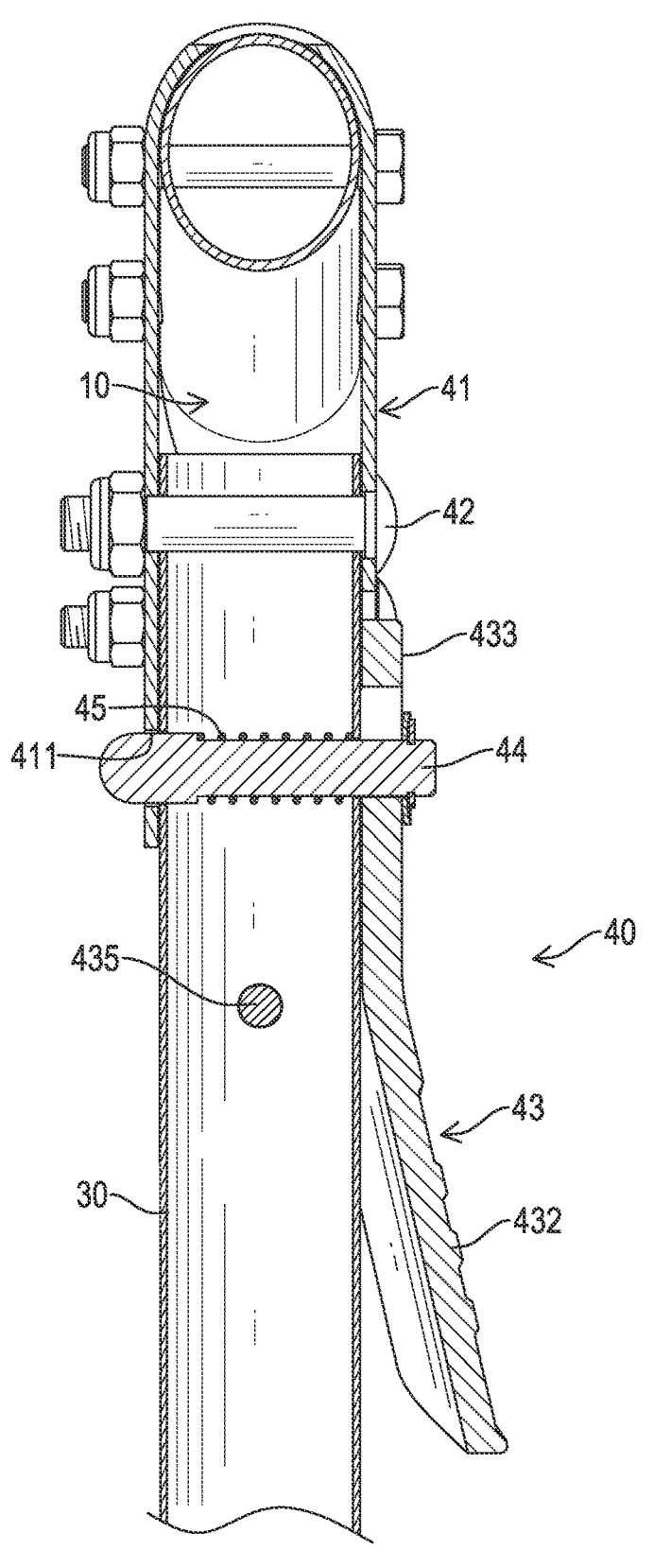
FIG. 4 is an enlarged cross sectional side view of the wheeled stand in FIG. 1.
Figure 5:
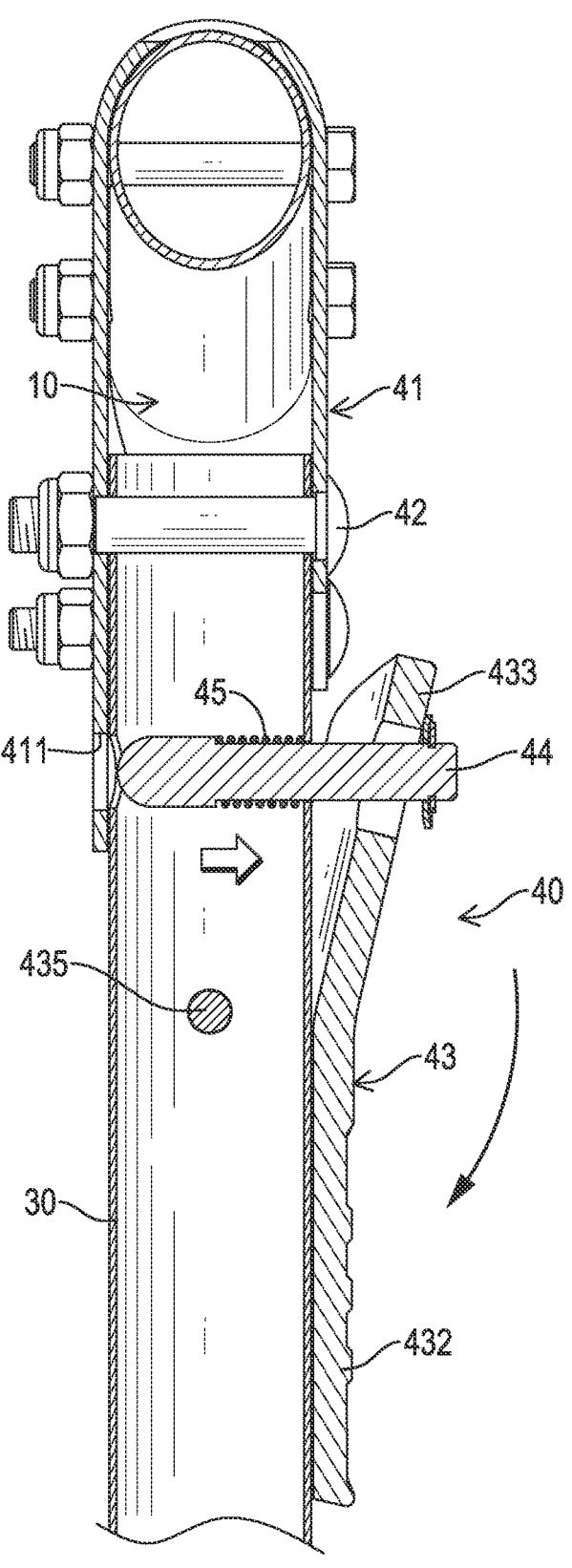
FIG. 5 is an operational enlarged cross sectional side view of the wheeled stand in FIG. 4.

3 handle 43. When the unlocking handle 43 is pivoted, the locking pin 44 is driven to separate apart from the positioning seat 41 for unlocking the kickstand 30. With reference to FIGS. 3 to 5, the unlocking handle 43 has a pivoted portion 431 pivotably connected to the kickstand 30, a pressing portion 432 and a locking portion 433 respectively disposed at opposite two sides of the pressing portion 432. The locking pin 44 is connected to the locking portion 433. When the pressing portion 432 is pressed toward the kickstand 30, the locking portion 433 with the locking pin 44 is moved away from the kickstand 30 to drive the locking pin 44 to separate from the positioning seat 41. So, the kickstand 30 is unlocked and can be pivoted around the kickstand pivot 42. When the kickstand 30 is moved to a position where the locking pin 44 faces either one of the first and the second locking holes 411, 412, the spring 45 will push the locking pin 44 to extend into either one of the first and the second locking holes 411, 412 to lock the kickstand 30 in position.

With reference to FIGS. 1, 2, and 6 to 8, the stand body 10 may be foldable and comprises a platform 11, a first foot set 12 connected to the platform 11, and a second foot set 13 connected to the platform 11. The platform 11 is configured for being mounted by the table saw 50. The first foot set 12 is pivotably connected to the platform 11. The second foot set 13 is pivotably connected to the first foot set 12. The second foot set 13 is connected to the platform 11 via a connecting frame 14. The connecting frame 14 is pivotably connected to the platform 11 and the second foot set 13. The wheels 20 are connected to the second foot set 13. The kickstand 30 is connected to the first foot set 12. The positioning seat 41 is disposed to the first foot set 12.

With reference to FIG. 8, to cut the workpiece 60, the kickstand 30 is unfolded and supports the stand body 10 at the outfeed side of the stand body 10. The user stands at the infeed side of the stand body 10 and pushes the workpiece 60 toward the outfeed side through a saw of the table saw 50 for cutting the workpiece 60. Because the kickstand 30 obliquely supports the outfeed side of the stand body 10, the stand body 10 is hard to be tipped over. The wheeled stand 100 is anti-tip and can stably support the table saw 50 during cutting the workpiece 60. With reference to FIGS. 6 and 7, because the kickstand 30 is foldable, so after cutting the workpiece 60, the kickstand 30 can be folded, during delivery, and free from extending outwardly to bump into surroundings.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wheeled stand for a table saw, the wheeled stand comprising:
a stand body having
a first side;
a second side opposite to the first side;
an infeed side; and
an outfeed side opposite to the infeed side;
two wheels rotatably connected to the stand body, disposed near the second side of the stand body, and respectively disposed near the infeed side and the outfeed side of the stand body, each one of the two wheels having an infeed-facing axial end facing toward the infeed side of the stand body and an outfeed-facing axial end facing toward the outfeed side of the stand body;
a kickstand pivotably connected to the stand body, disposed at the outfeed side of the stand body, and having a folded position and an unfolded position in which the kickstand obliquely extends downwardly and away from the infeed side of the stand body, when the kickstand is in the unfolded position, a downward-facing end of the kickstand at the outfeed side of the stand body is spaced apart, along a direction extending from the infeed side toward the outfeed side of the stand body, from the outfeed-facing axial end of one of the two wheels disposed adjacent the outfeed side of the stand body; and
a lock assembly connected between the stand body and the kickstand to keep the kickstand in either one of the folded position and the unfolded position, the lock assembly comprising a positioning seat, an unlocking handle, a locking pin, and a spring; wherein
the positioning seat is mounted to the stand body and has a first locking hole and a second locking hole arranged at an angular interval, the first locking hole corresponds to the unfolded position of the kickstand in position, and the second locking hole corresponds to the folded position of the kickstand in position;
the kickstand is pivotably connected to the positioning seat and is connected to the stand body via the positioning seat;
the unlocking handle is pivotably connected to the kickstand;
the locking pin is connected to the unlocking handle and selectively extends into one of the first locking hole and the second locking hole to lock the kickstand in either one of the unfolded position and the folded position;
the unlocking handle is configured to be pivoted to drive the locking pin for unlocking the kickstand;
the spring abuts against both the locking pin and the kickstand to push the locking pin away from the unlocking handle;
the unlocking handle has a pivoted portion pivotably connected to the kickstand, a pressing portion and a locking portion respectively disposed at opposite two sides of the pivoted portion;
the locking pin is connected to the locking portion; and
the pressing portion is configured to be pressed toward the kickstand to drive the locking portion with the locking pin away from the kickstand.

2. The wheeled stand for the table saw as claimed in claim 1, wherein the stand body is foldable.

3. The wheeled stand for the table saw as claimed in claim 1, wherein the stand body comprises
a platform;
a first foot set connected to the platform; and
a second foot set connected to the platform.

4. The wheeled stand for the table saw as claimed in claim 3, wherein
the first foot set is pivotably connected to the platform;
the second foot set is pivotably connected to the first foot set;
a connecting frame is pivotably connected to the platform and the second foot set; and
the two wheels are connected to the second foot set.

* * * * *